(12) United States Patent
Hong et al.

(10) Patent No.: US 8,608,400 B2
(45) Date of Patent: Dec. 17, 2013

(54) POSITION ARRANGEMENT DEVICE AND JOINT MODULE THEREOF

(75) Inventors: Sang Joon Hong, Suwon-si (KR); In Bae Jang, Seoul (KR); Sang Hyun Park, Yongin-si (KR); Ho Seok Choi, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/309,898

(22) Filed: Dec. 2, 2011

(65) Prior Publication Data

US 2012/0148338 A1 Jun. 14, 2012

(30) Foreign Application Priority Data

Dec. 9, 2010 (KR) ........................ 10-2010-0125374

(51) Int. Cl.
 *B23Q 3/06* (2006.01)
 *B25B 5/10* (2006.01)
 *F16B 1/00* (2006.01)

(52) U.S. Cl.
 USPC ............................ 403/220; 269/246; 248/574

(58) Field of Classification Search
 USPC .......... 403/220; 248/575, 288.51, 694, 178.1; 310/317, 318; 269/289 R, 43, 45, 246, 269/291, 254; 29/281.1, 271
 IPC ...................................... F16B 1/00; A47F 5/00
 See application file for complete search history.

(56) References Cited

U.S. PATENT DOCUMENTS

| | | | | |
|---|---|---|---|---|
| 1,790,516 A * | 1/1931 | Williams | ......................... | 464/17 |
| 2,641,434 A * | 6/1953 | Henshaw | ................... | 267/141.6 |
| 2,708,560 A * | 5/1955 | Paley | ............................. | 248/575 |
| 3,949,878 A * | 4/1976 | Doane | .......................... | 206/591 |
| 4,593,501 A * | 6/1986 | Delfosse | ....................... | 52/167.8 |
| 4,613,105 A * | 9/1986 | Genequand et al. | ........ | 248/178.1 |
| 4,613,782 A * | 9/1986 | Mori et al. | ................ | 310/323.16 |
| 4,686,440 A * | 8/1987 | Hatamura et al. | ............ | 318/646 |
| 4,694,477 A * | 9/1987 | Siddall | ............................ | 378/34 |
| 5,303,035 A * | 4/1994 | Luecke et al. | ................ | 356/399 |
| 5,903,085 A * | 5/1999 | Karam | .......................... | 310/328 |
| 6,157,115 A * | 12/2000 | Hassler, Jr. | .................... | 310/328 |
| 6,736,361 B2 * | 5/2004 | Price | ........................ | 248/288.51 |
| 6,791,669 B2 * | 9/2004 | Poon | .................................. | 355/72 |
| 6,872,958 B2 * | 3/2005 | Andeen et al. | ............. | 250/492.2 |
| 7,117,724 B1 * | 10/2006 | Goodberlet et al. | ............ | 73/105 |
| 7,218,032 B2 * | 5/2007 | Kim | .............................. | 310/323.17 |
| 7,417,358 B2 * | 8/2008 | Sugahara | ...................... | 310/328 |
| 7,521,839 B2 * | 4/2009 | Mori | ......................... | 310/323.02 |
| 7,916,408 B2 * | 3/2011 | Blanding et al. | .............. | 359/813 |
| 8,018,123 B2 * | 9/2011 | Mukae | ........................... | 310/317 |
| 2005/0231075 A1* | 10/2005 | Xu | .................................. | 310/328 |
| 2010/0038995 A1* | 2/2010 | Claeyssen et al. | ........ | 310/323.02 |
| 2011/0070019 A1* | 3/2011 | Song et al. | ...................... | 403/26 |
| 2012/0200947 A1* | 8/2012 | Hopkins et al. | ............... | 359/819 |

FOREIGN PATENT DOCUMENTS

KR 100263417 B1 8/2000

* cited by examiner

*Primary Examiner* — Lee D Wilson
*Assistant Examiner* — Marc Carlson
(74) *Attorney, Agent, or Firm* — Harness, Dickey & Pierce, P.L.C.

(57) ABSTRACT

According to an example embodiment, a position arrangement device includes at least one joint module between a first base and a second base. The at least one joint module is configured to adjust a position of the second base relative to the first base based on elastic flexion in the joint module.

16 Claims, 10 Drawing Sheets

FIG. 10

POSITION ARRANGEMENT DEVICE AND JOINT MODULE THEREOF

CROSS-REFERENCE TO RELATED APPLICATION

This application claims priority under 35 U.S.C. §119 to the benefit of Korean Patent Application No. 2010-0125374, filed on Dec. 9, 2010 in the Korean Intellectual Property Office, the disclosure of which is incorporated herein in its entirety by reference.

BACKGROUND

1. Field

Some example embodiments relate to a position arrangement device having improved positioning accuracy.

2. Description of the Related Art

In general, kinematic joints are used to assure arrangement of high-precision parts at accurate positions during assembly or disassembly thereof. Although kinematic joints are designed based on various principles, point contact between a ball and a plane is generally employed. Under the concept that contact between a ball and a plane has one degree of freedom, point contact between three balls and six planes will have six degrees of freedom x, y, z, $\theta$ x, $\theta$ y and $\theta$ z, which enables positioning with accuracy and repeatability. Arranging three balls and corresponding planes may include the following two representative examples. In the first example, "3-2-1" point contacts are obtained using the combination of a tetrahedron, a V-shaped groove and a plane, whereby a total of six point contacts have six degrees of freedom. In the second example, three V-shaped planes are radially arranged by 120 degrees (or other corresponding angles), whereby a total of six point contacts have six degrees of freedom.

The above-described kinematic joints have characteristics of being fixed at accurate positions even if they are repeatedly assembled and disassembled and therefore, are employed in a variety of high-precision equipment including high-precision optical systems. However, since using the kinematic joints may often require control of the posture of a corresponding plane, a device to transfer one side of the kinematic joint in a height direction may be necessary. To this end, various joint transfer devices may be put to use.

SUMMARY

Some example embodiments relate to a position arrangement device, which may achieve good rigidity in all degrees of freedom except for a specific one.

Some example embodiments relate to a position arrangement device, which has a single module form, thereby achieving a low assembly tolerance.

According to an example embodiment, a position arrangement device includes a first base, a second base spaced apart from the first base, and a joint module between the first base and the second base, wherein the joint module is configured to adjust a position of the second base relative to the first base based on elastic flexion in the joint module.

The joint module may include a flexure including a separated portion supported by the first base, a coupled portion, and a flexible portion between the coupled portion and the separated portion. The flexible portion may be configured to elastic flexion such that a distance between the separated portion and the second base may increase or decrease.

The joint module may be configured to maintain a constant distance between the separated portion and the first base during elastic flexion of the flexible portion.

The joint module may further include a body secured to the second base and coupled to the coupled portion, an extension member extending from the body toward the separated portion, and an adjusting member configured to adjust a distance between the extension member and the separated portion.

The adjusting member may include a first screw screwed to the extension member and a second screw screwed to the separated portion of the flexure. The first screw and the second screw may have different pitches.

The pitch of the first screw may be greater than the pitch of the second screw.

The joint module may further include a reference member between the first screw and a first screw hole of the extension member. The reference member may be screwed to both the first screw and the first screw hole.

The joint module may further include a preload member configured to maintain a constant distance between the separated portion and the first base.

The preload member may include a fastener having at least a part screwed into a seating member, and an elastic member configured to apply elastic force to the fastener.

The joint module may further include a body secured to the second base and coupled to the coupled portion, and a securing member configured to restrict relative movement between the body and the flexure after adjustment of the position of the second base relative to the first base.

The securing member may include a leaf spring. A side of the leaf spring may be secured to the body and an other side of the leaf spring may be secured to the flexure.

The joint module may further include a ball between the separated portion and the first base.

The ball may be attached to the separated portion by epoxy resin.

The joint module may further include a seating member secured to the first base. The ball may be seated on the seating member.

The seating member may include a plurality of shafts, each of the plurality of shafts coming into point contact with the ball.

According to an example embodiment, a joint module may be configured to adjust a position of a second base relative to a first base based on elastic flexion in the joint module.

The joint module may include a body configured to be secured to the second base, a flexure including a coupled portion coupled to the body, a separated portion spaced apart from the body and configured to be supported by the first base, and a flexible portion between the coupled portion and the separated portion, an extension member extending from the body toward the separated portion, and an adjusting member configured to adjust a distance between the extension member and the separated portion, wherein the flexible portion is configured to elastic flexion based on operation of the adjusting member to increase or decrease a distance between the extension member and the separated portion.

The joint module may further include a preload member configured to maintain a constant distance between the separated portion and the first base.

The joint module may further include a securing member configured to restrict relative movement between the body and the flexure.

BRIEF DESCRIPTION OF THE DRAWINGS

The foregoing and/or other features of example embodiments will become apparent and more readily appreciated from the following description of non-limiting embodiments, as illustrated in the accompanying drawings in which like reference characters refer to the same parts throughout the different views. The drawings are not necessarily to scale, emphasis instead being placed upon illustrating the principles of example embodiments. In the drawings.

DETAILED DESCRIPTION

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey concepts of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 1:
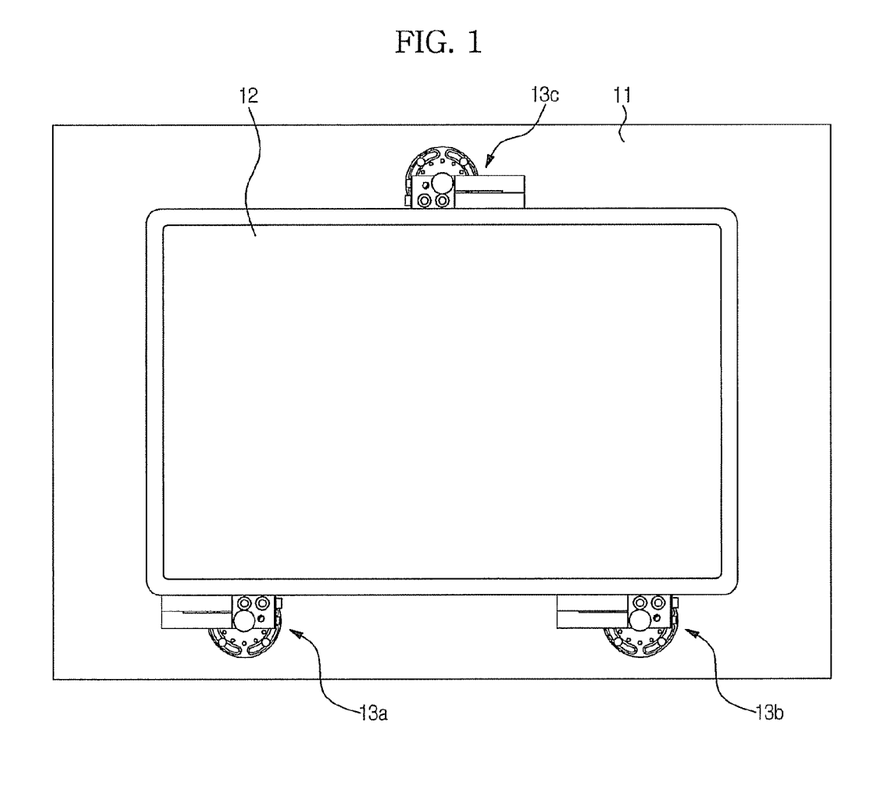
FIG. 1 is a plan view illustrating a position arrangement device according to an example embodiment.
Figure 2:
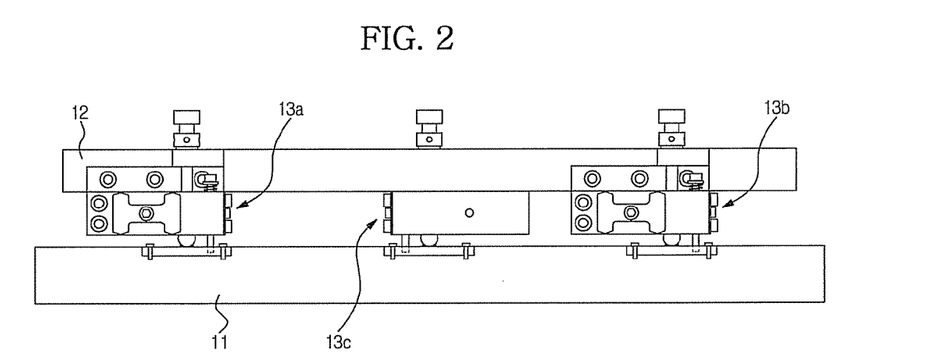
FIG. 2 is a sectional view of the position arrangement device in FIG. 1.

FIG. 1 is a plan view illustrating a position arrangement device according to an example embodiment, and FIG. 2 is a sectional view of the position arrangement device according to an example embodiment.

As illustrated in FIGS. 1 and 2, the position arrangement device may include a first base 11, a second base 12 upwardly spaced apart from the first base 11 and a plurality of joint modules 13 between the first base 11 and the second base 12.

The position arrangement device may be an optical appliance controller. For example, the position arrangement device may serve to control the posture of a manual chuck used in exposure or inspection appliances or to control lens or mirror mounting appliances, or may be a precision machine leveling device.

Hereinafter, for convenience of description, the case where the positioning arrangement device serves as a chuck posture control device will be described by way of example.

In this case, the first base 11 may be a stage. The stage is movable in three-axes by a stage drive unit (not shown).

The second base 12 may be configured to support a chuck (not shown). The chuck may be secured to the second base 12 by air suction or using a separate structure.

The plurality of joint modules 13 may support the second base 12 at three points. Each of the joint modules 13 may function not only to vertically move the second base 12, but also to keep the second base 12 horizontal. For example, the first to third joint modules 13a, 13b and 13c may be controlled to vertically move the second base 12 along the z-axis, or may be controlled individually to keep the second base 12 horizontal.

Figure 3:
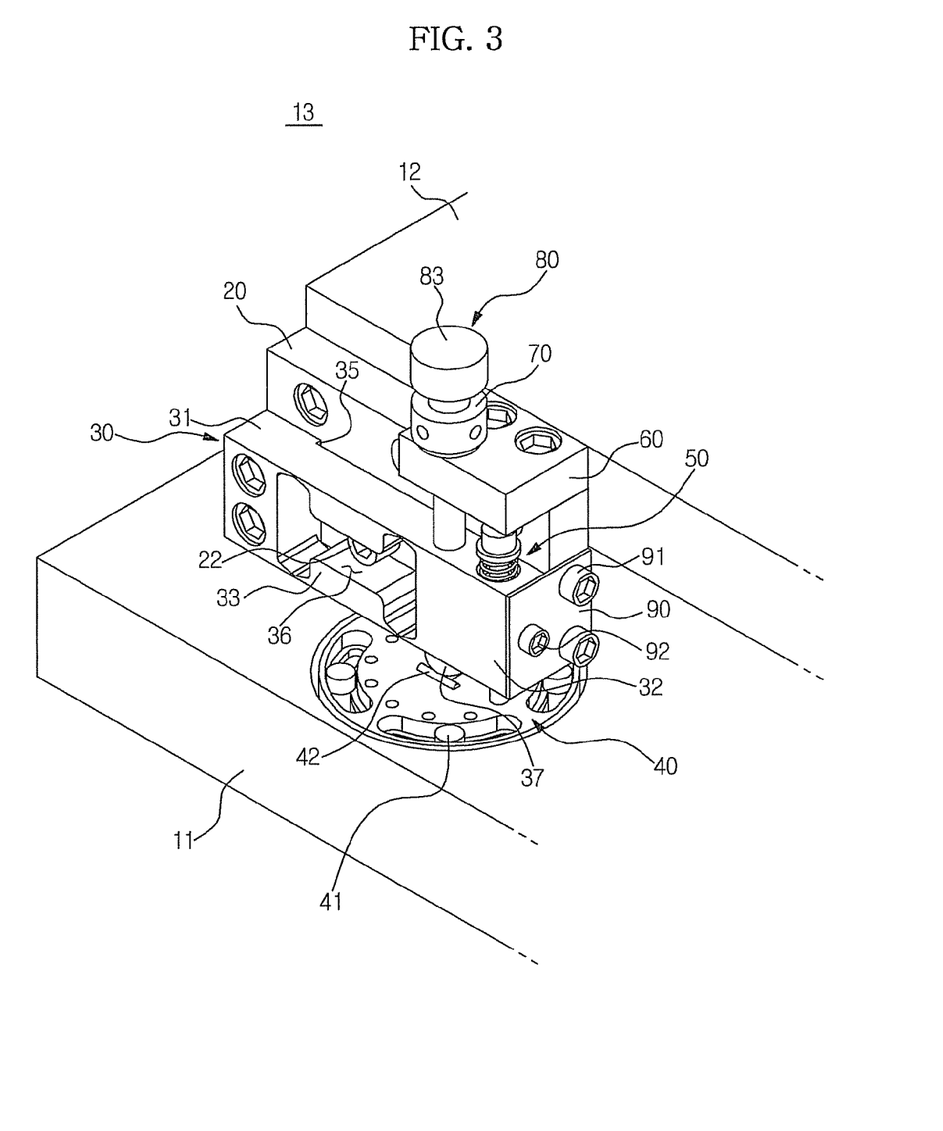
FIG. 3 is a perspective view illustrating a joint module according to an example embodiment.
Figure 4:
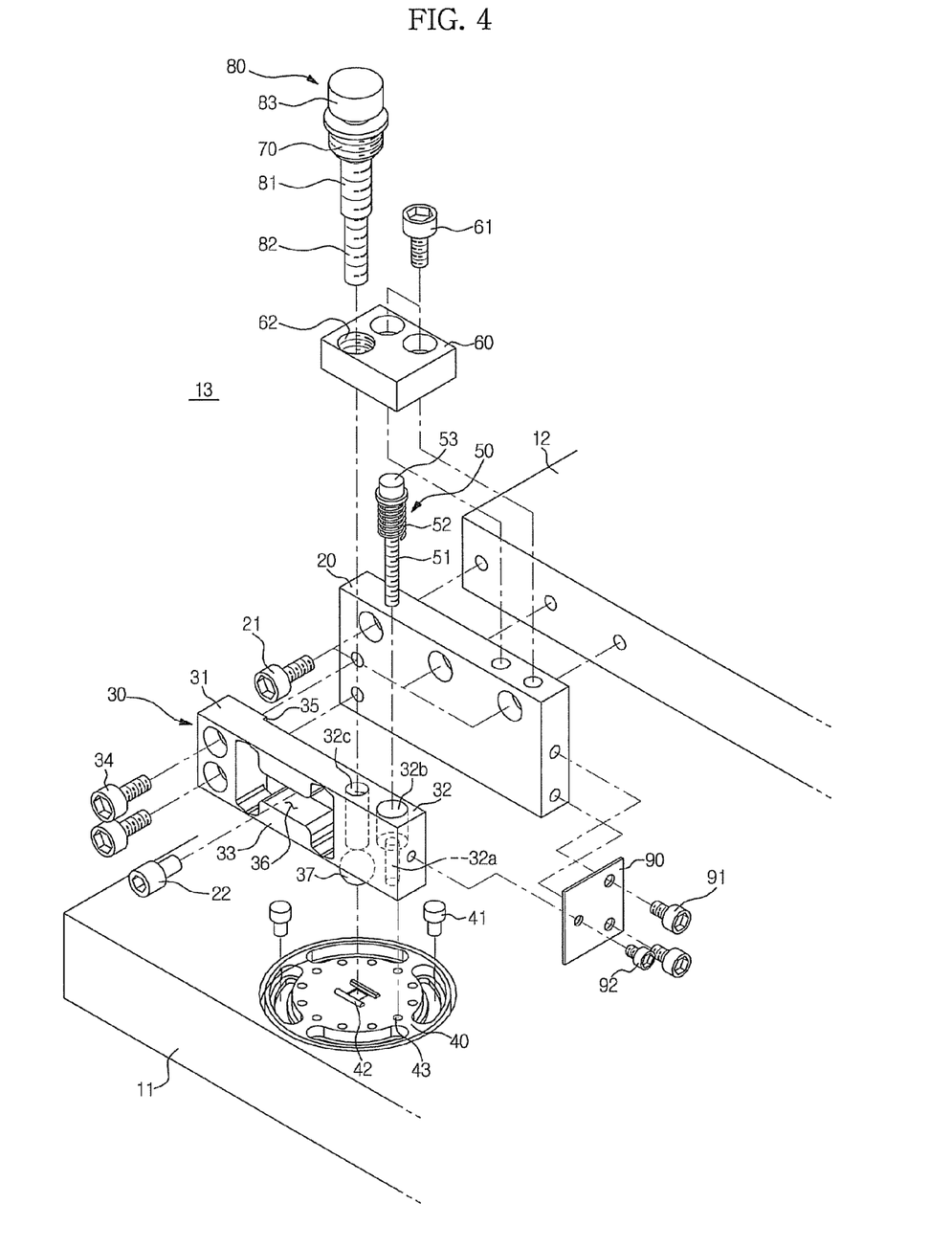
FIG. 4 is an exploded perspective view of the joint module according to an example embodiment.
Figure 5:
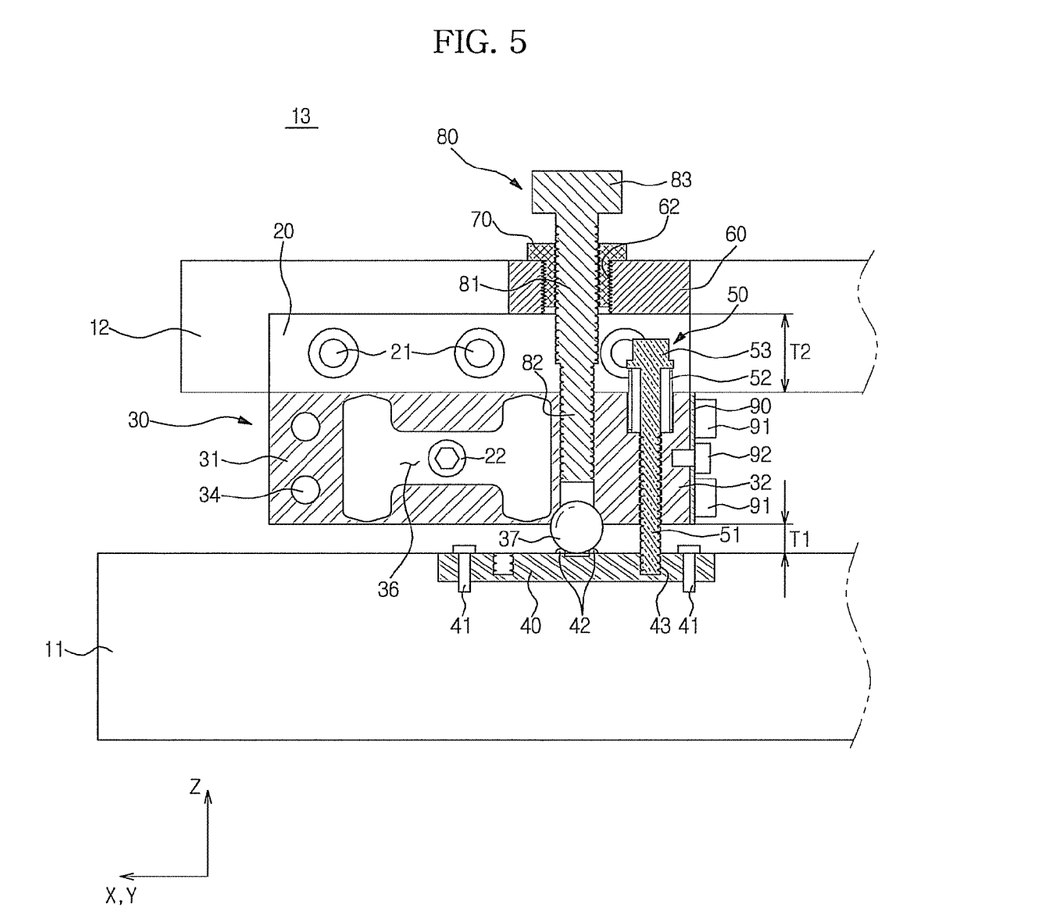
FIG. 5 is a sectional view of the joint module according to an example embodiment.
Figure 6:
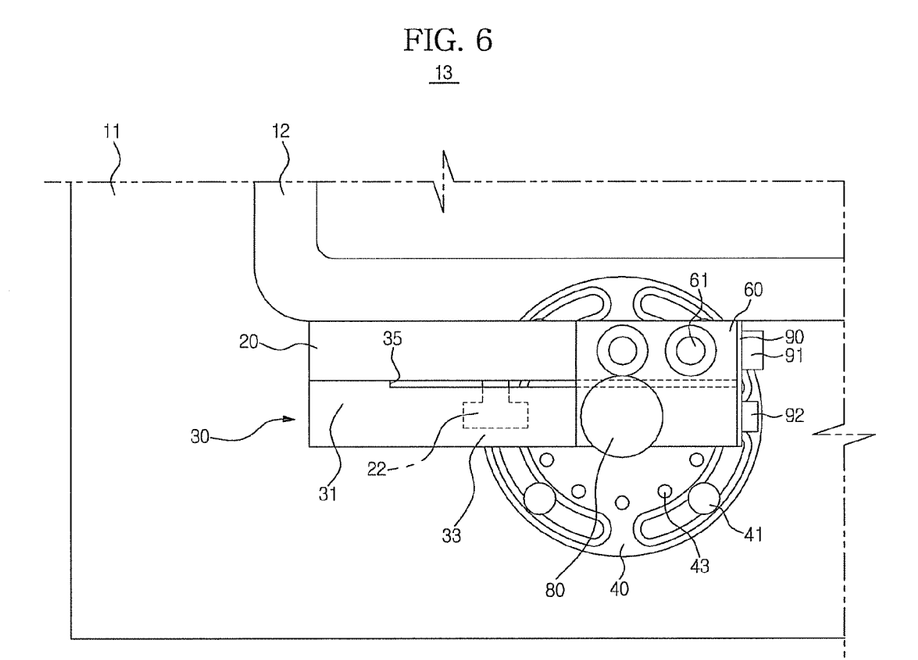
FIG. 6 is a plan view of the joint module according to an example embodiment.

FIG. 3 is a perspective view illustrating the joint module according to an example embodiment, FIG. 4 is an exploded perspective view of the joint module according to an example embodiment, FIG. 5 is a sectional view of the joint module according to an example embodiment, and FIG. 6 is a plan view of the joint module according to an example embodiment.

As illustrated in FIGS. 3 to 6, each joint module 13 may include a body 20, a flexure 30, a seating member 40, a preload member 50, an extension member 60, a reference member 70, an adjusting member 80 and a securing member 90.

The body 20 is secured to the second base 12 by a plurality of first bolts 21. The body 20 is immovably secured to the second base 12 and thus, the body 20 and the second base 12 are moved in unison. For example, if the body 20 is vertically moved, the second base 12 is also vertically moved.

The flexure 30 may include a coupled portion 31 coupled to the body 20, a separated portion 32 spaced apart from the body 20 and a flexible portion 33 provided between the coupled portion 31 and the separated portion 32.

The coupled portion 31 is secured to the body 20 by a plurality of second bolts 34. The coupled portion 31 is immovably secured to the body 20 and thus, the coupled portion 31 and the body 20 are moved in unison.

The flexible portion 33 and the separated portion 32 are spaced apart from the body 20. Also, the flexible portion 33 and the separated portion 32 are stepped from the coupled portion 31. More specifically, a stepped portion 35 is formed at a boundary between the coupled portion 31 and the flexible portion 33. The stepped portion 35 allows the flexible portion 33 and the separated portion 32 to be spaced apart from the body 20 by a desired (or alternatively predetermined) distance.

The flexible portion 33 is elastically flexible. The flexible portion 33 has a dumbbell-shaped recess 36, thus being elastically flexed within a yield stress limit thereof as the separated portion 32 is vertically moved. The flexible portion 33 may also be elastically flexed as the coupled portion 31 is vertically moved. A flexion restrainer 22 is inserted in the center of the recess 36 of the flexible portion 33. The flexion restrainer 22 limits and/or prevents the flexible portion 33 from being flexed beyond the yield stress limit thereof. The flexion restrainer 22 protrudes from the body 20 so as to be inserted into the recess 36 of the flexible portion 33.

The separated portion 32 may be supported by the second base 12. A spherical ball 37 is attached to a lower surface of the separated portion 32 by epoxy resin. By using epoxy to attach the spherical ball 37 to a lower surface of the separated portion 32, the ball 37 may be integrally formed with the separated portion 32 and may be moved along with the separated portion 32. The seating member 40 may be coupled to the first base 11 by a plurality of third bolts 41. The seating member 40 includes two shafts 42 to support the ball 37 at two points. Thus, each shaft 42 comes into point contact with the ball 37.

The preload member 50 may serve to allow the separated portion 32 to be firmly connected to and/or supported by the second base 12. The preload member 50 may include a fastener 51 and an elastic member 52.

The fastener 51 is screwed to the separated portion 32 and the seating member 40. A middle portion of the fastener 51 is screwed through a first fastening hole 32a of the flexure 30 and a lower portion of the fastener 51 is screwed through a second fastening hole 43 of the seating member 40. The fastener 51 maintains a constant and/or about constant distance T1 between the separated portion 32 and the first base 11.

The elastic member 52 elastically supports the fastener 51. A lower end of the elastic member 52 is inserted into and supported by an insertion hole 32b of the separated portion 32, and an upper end of the elastic member 52 is elastically supported by a fastening regulator 53 provided at an upper end of the fastener 51. The elastic member 52 may reduce and/or remove backlash (or an assembly tolerance) due to screwing of the fastener 51 and the separated portion 32 by pushing the fastener 51 upward. The elastic member 52 may further reduce and/or remove backlash (or an assembly tolerance) due to screwing of the fastener 51 and the seating member 40.

The extension member 60 may be coupled to the body 20 by a plurality of fourth bolts 61. The extension member 60 is coupled to the body 20 to extend toward the separated portion 32 of the flexure 30. The extension member 60 is immovably secured to the body 20 and thus, is moved along with the body 20. For example, if the extension member 60 is vertically moved, the body 20 is also vertically moved.

The extension member 60 is arranged such that an upper surface thereof remains level with an upper surface of the second base 12.

The reference member 70 is inserted in the first screw hole 62 of the extension member 60 by screwing. The reference member 70 has an outer circumference screwed to the extension member 60 and an inner surface screwed to a first screw portion 81 of the adjusting member 80. The reference member 70 may be used to change an initial position of the adjusting member 80. For example, the adjusting member 80 may be vertically moved as the reference member 70 and the adjusting member 80 are rotated in the same direction or in different directions.

The adjusting member 80 may include the first screw portion 81, a second screw portion 82 and a head 83. The first screw portion 81 may be inserted in the reference member 70 by screwing, and the second screw portion 82 may be inserted in a second screw hole 32c of the separated portion 32 by screwing. The first screw portion 81 is molded into a unified screw (having a pitch of 1.27 mm), and the second screw portion 82 is molded into a metric screw (having a pitch of 1.25 mm). Thus, if the head 83 is turned, a distance 12 between the extension member 60 and the separated portion 32 of the flexure 30 increases or decreases by 20 μm per turn. In this way, the extension member 60 may be vertically moved along the z-axis and may be adjusted to remain level with the second base 12.

The securing member 90 may be coupled after completion of height control. The securing member 90 includes a leaf spring, one side of the securing member 90 is secured to a side surface of the body 20 by a plurality of fifth bolts 91 and the other side of the securing member 90 is secured to a side surface of the flexure 30 by at least one sixth bolt 92. As the securing member 90 is horizontally coupled to the side surface of the body 20 and the side surface of the flexure 30 along the x-axis or y-axis, the securing member 90 is easily horizontally flexible along the x-axis or y-axis, which reduces and/or minimizes vertical misalignment along the z-axis.

Figure 7:
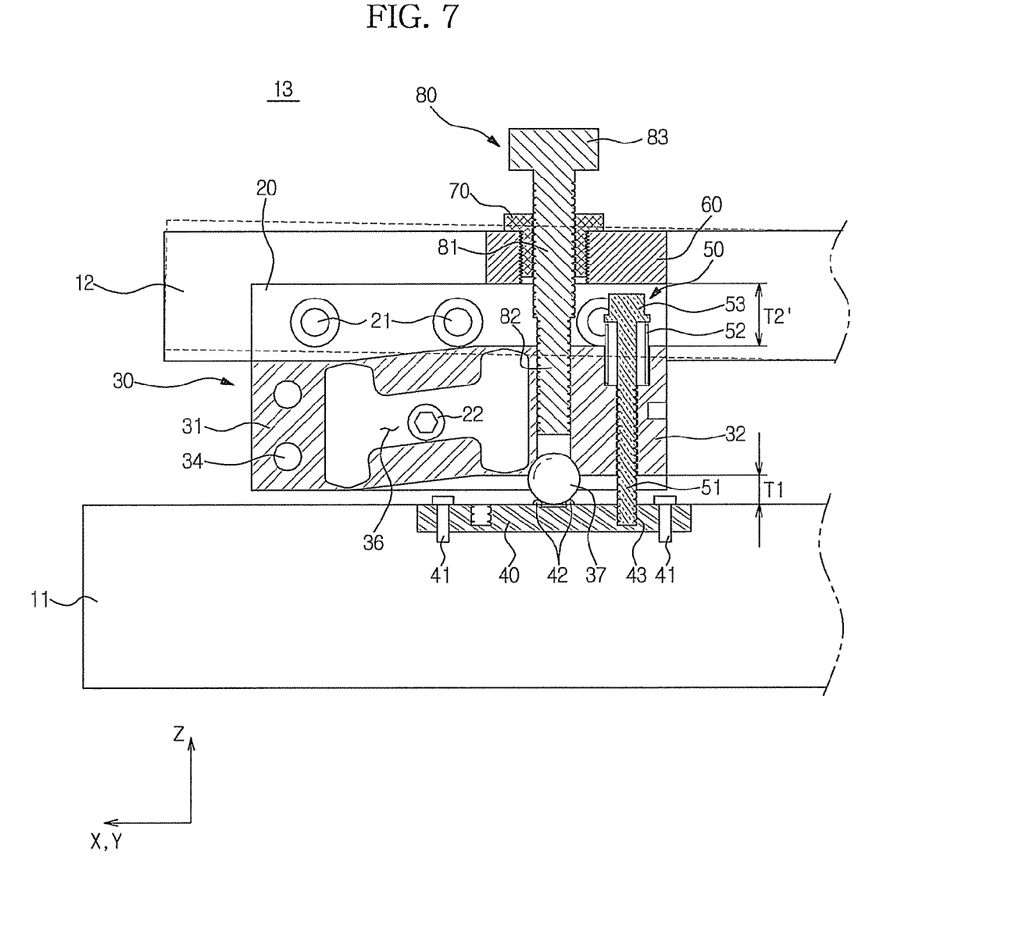
FIG. 7 is a sectional view illustrating downward movement of a second base according to an example embodiment.
Figure 8:
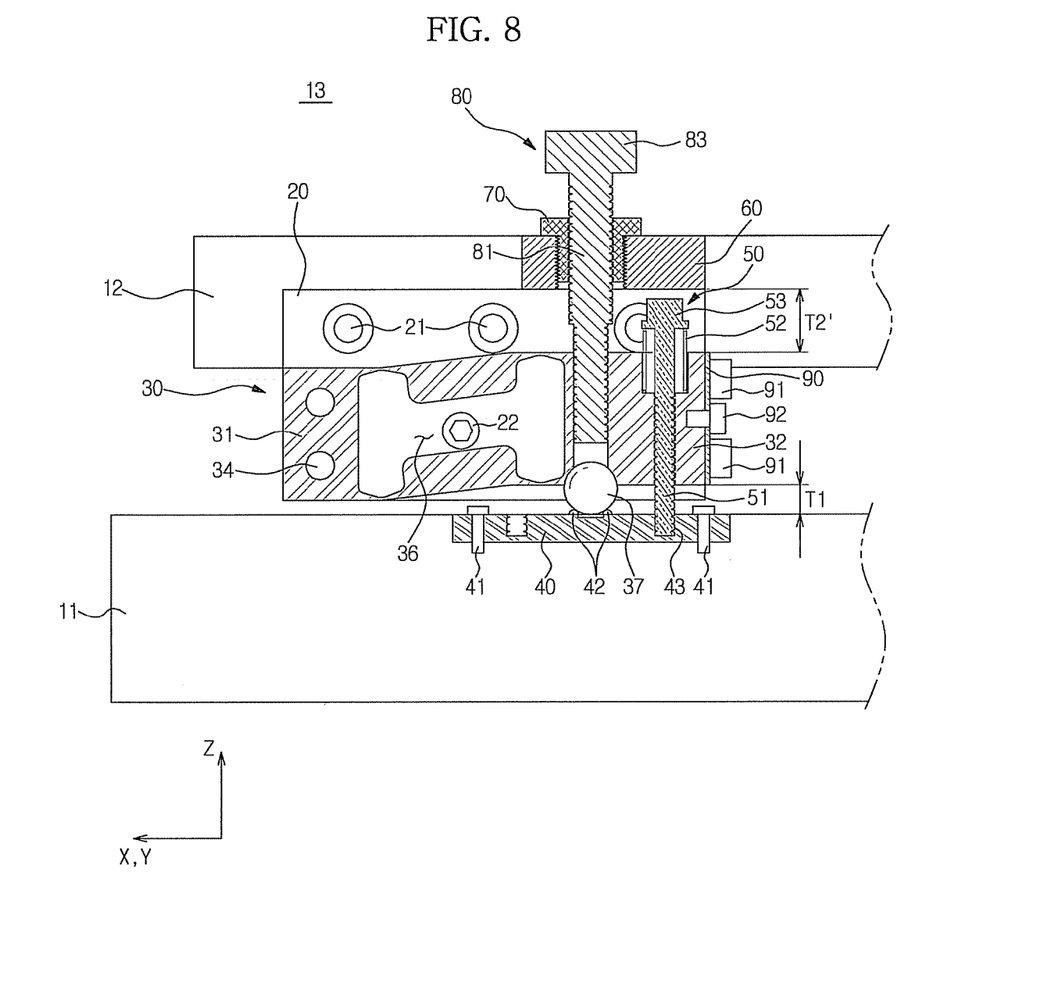
FIG. 8 is a view illustrating a securing member to keep the second base in the state of FIG. 7.

FIG. 7 is a sectional view illustrating downward movement of the second base 12 according to an example embodiment, and FIG. 8 is a view illustrating the securing member to keep the second base 12 in the state of FIG. 7.

Referring to FIG. 7, a user may control the height of the second base 12 by controlling each joint module 13 as illustrated in FIGS. 1 to 8. In this case, the securing member 90 is released from the body 20 and the flexure 30.

If the head 83 is turned once counterclockwise, the first screw portion 81 is upwardly moved by the pitch of 1.27 mm thereof. Here, the reference member 70 is firmly tightened to the extension member 60 and thus, is not turned. The second screw portion 82 is upwardly moved by the pitch of 1.25 mm thereof. Here, the first screw portion 81 and the second screw portion 82 have a difference in movement distance of 20 μm.

Since the distance T1 between the flexure 30 and the first base 11 is kept constant by the preload member 50, a distance T2' between the extension member 60 and the separated portion 32 of the flexure 30 decreases by 20 μm (T2' is less than T2). The extension member 60 is moved downward to the flexure 30 by 20 μm. Thereby, the body 20 bolted to the extension member 60 is moved downward and in turn, the coupled portion 31 of the flexure 30 bolted to the body 20 is moved downward. This causes elastic flexion of the flexible portion 33 of the flexure 30. Consequently, the second base 12 bolted to the body 20 is vertically moved downward toward the first base 11 along the z-axis by 20 μm.

In this way, the second base 12 may be vertically moved along the z-axis while remaining level with a horizontal plane as the head 83 is turned counterclockwise.

Thereafter, as illustrated in FIG. 8, the user may secure one side of the securing member 90 to the body 20 by the plurality of fifth bolts 91 and the other side of the securing member 90 to the flexure 30 by the at least one sixth bolt 92, thereby reducing and/or preventing misalignment.

Figure 9:
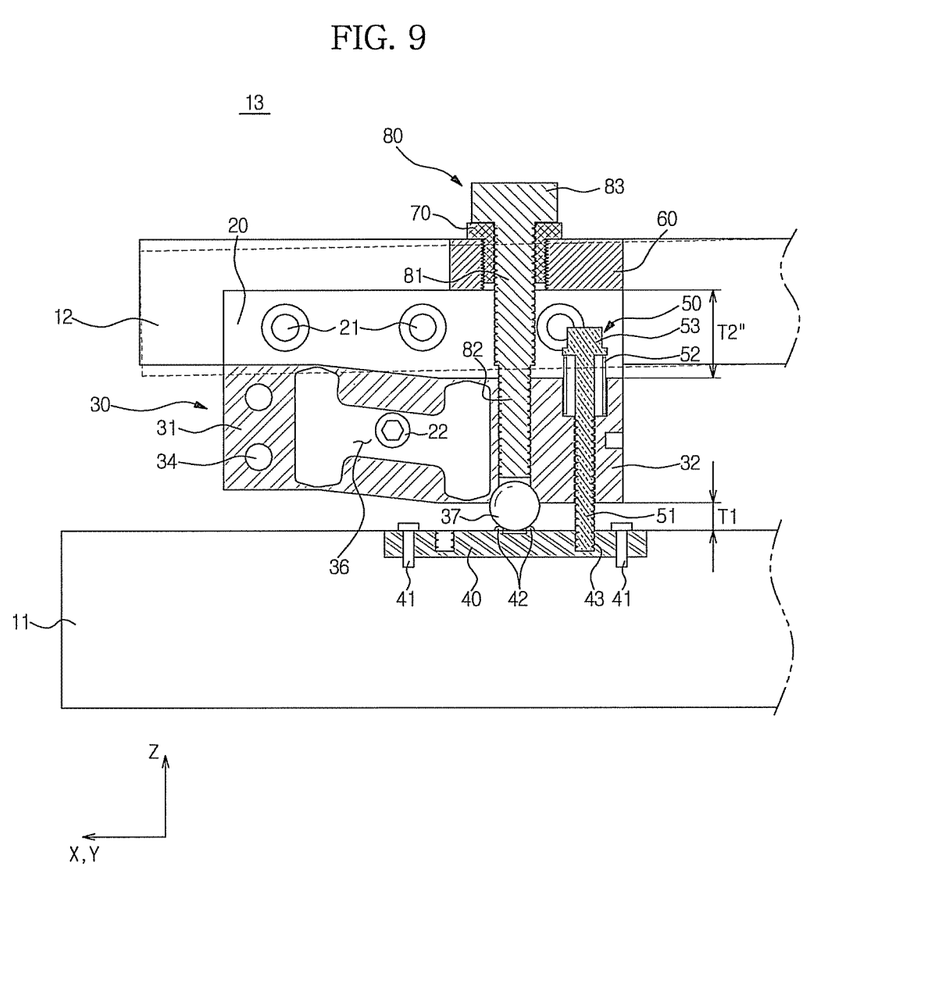
FIG. 9 is a sectional view illustrating upward movement of the second base according to an example embodiment.
Figure 10:
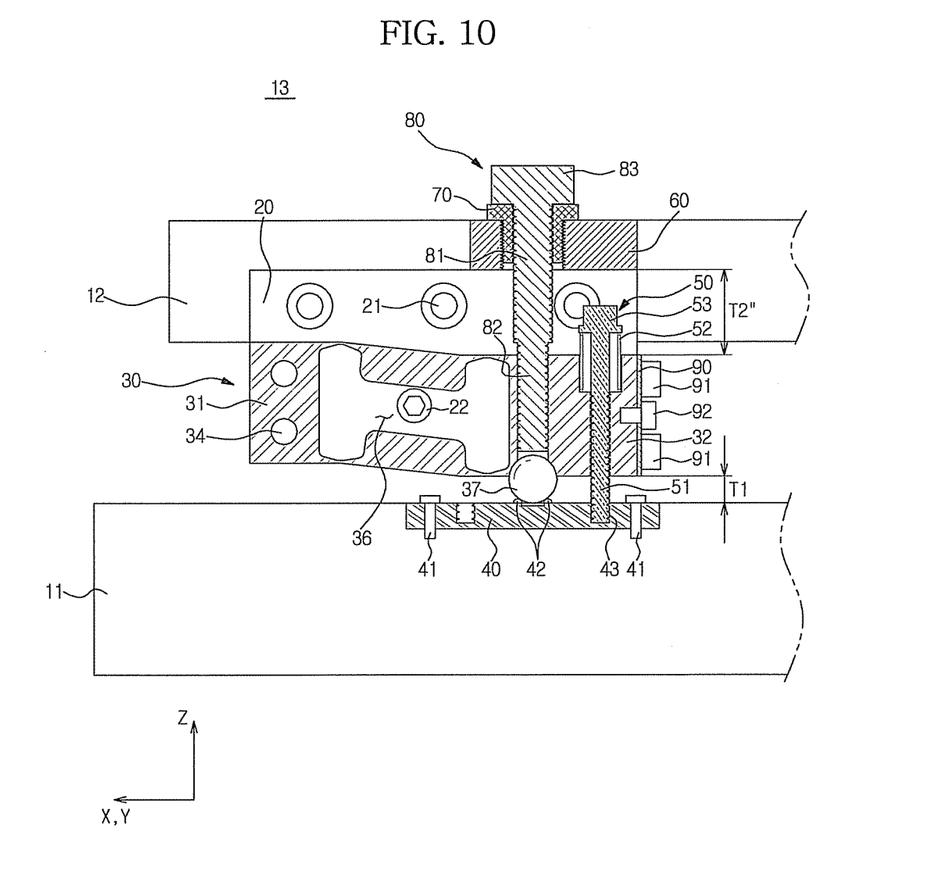
FIG. 10 is a view illustrating the securing member to keep the second base in the state of FIG. 9.

FIG. 9 is a sectional view illustrating upward movement of the second base 12 according to an example embodiment, and FIG. 10 is a view illustrating the securing member 90 to keep the second base 12 in the state of FIG. 9.

Referring to FIG. 9, the user may control the height of the second base 12 by controlling each joint module 13 as illustrated in FIGS. 1 to 8. In this case, the securing member 90 is released from the body 20 and the flexure 30.

If the head 83 is turned once clockwise, the first screw portion 81 is downwardly moved by the pitch of 1.27 mm thereof. Here, the reference member 70 is firmly tightened to the extension member 60 and thus, is not turned. The second screw portion 82 is downwardly moved by the pitch of 1.25 mm thereof. Here, the first screw portion 81 and the second screw portion 82 have a difference in movement distance of 20 μm.

Since the distance T1 between the flexure 30 and the first base 11 is kept constant by the preload member 50, a distance T2" between the extension member 60 and the separated portion 32 of the flexure 30 increases by 20 μm (T2" is more than T2). The extension member 60 is moved upward away from the flexure 30 by 20 μm. Thereby, the body 20 bolted to the extension member 60 is moved upward and in turn, the coupled portion 31 of the flexure 30 bolted to the body 20 is moved upward. This causes elastic flexion of the flexible portion 33 of the flexure 30. Consequently, the second base 12 bolted to the body 20 is vertically moved upward away from the first base 11 along the z-axis by 20 μm.

In this way, the second base 12 may be vertically moved along the z-axis while remaining level with a horizontal plane as the head 83 is turned clockwise.

Thereafter, as illustrated in FIG. 10, the user may secure one side of the securing member 90 to the body 20 by the plurality of fifth bolts 91 and the other side of the securing member 90 to the flexure 30 by the at least one sixth bolt 92, thereby reducing and/or preventing misalignment.

As is apparent from the above description, a position arrangement device according to an example embodiment may reduce and/or prevent deterioration in positioning accuracy upon height control.

Although a few example embodiments have been shown and described, it will be understood by those of ordinary skill in the art that changes may be made without departing from the spirit and scope of the claims.

What is claimed is:

1. A position arrangement device comprising:
 a first base;
 a second base spaced apart from the first base; and
 a joint module between the first base and the second base, the joint module configured to adjust a position of the second base relative to the first base based on elastic flexion in the joint module,
 the joint module including,
  a flexure including,
   a separated portion supported by the first base,
   a coupled portion, and
   a flexible portion between the coupled portion and the separated portion, the flexible portion configured to elastic flexion such that a distance between the separated portion and the second base increases or decreases,
  a preload member configured to maintain a constant distance between the separated portion and the first base during elastic flexion of the flexible portion,
  a body secured to the second base and coupled to the coupled portion,
  an extension member extending from the body toward the separated portion, and
  an adjusting member configured to adjust a distance between the extension member and the separated portion,
   the adjusting member including a head integrally connected to a first screw portion and a second screw portion,
   the first screw portion and second screw portion having different thread pitches and being concentrically aligned so the head and first and second screw portions are configured to be rotated together,
   the first screw portion screwed to the extension member, and
   the second screw portion screwed to the separated portion of the flexure.

2. The device according to claim 1, wherein the pitch of the first screw portion is greater than the pitch of the second screw portion.

3. The device according to claim 1, wherein the joint module further includes:
 a reference member between the first screw portion and a first screw hole of the extension member,
 the reference member being screwed to both the first screw portion and the first screw hole.

4. The device according to claim 1, wherein the preload member includes:
   a fastener having at least a part screwed into a seating member; and
   an elastic member configured to apply an elastic force to the fastener.

5. The device according to claim 1, wherein the joint module further includes:
   a securing member configured to restrict relative movement between the body and the flexure after adjustment of the position of the second base relative to the first base.

6. The device according to claim 5, wherein:
   the securing member includes a leaf spring,
   a side of the leaf spring is secured to the body, and
   an other side of the leaf spring is secured to the flexure.

7. The device according to claim 1, wherein the joint module further includes:
   a ball between the separated portion and the first base.

8. The device according to claim 7, wherein the ball is attached to the separated portion by an epoxy resin.

9. The device according to claim 7, wherein the joint module further includes:
   a seating member secured to the first base,
   the ball being seated on the seating member.

10. A position arrangement device comprising:
    a first base;
    a second base spaced apart from the first base; and
    a joint module between the first base and the second base, the joint module configured to adjust a position of the second base relative to the first base based on elastic flexion in the joint module, wherein
    the joint module includes a flexure that includes,
        a separated portion supported by the first base,
        a coupled portion,
        a flexible portion between the coupled portion and the separated portion,
        the flexible portion configured to elastic flexion such that a distance between the separated portion and the second base increases or decreases, and
    the joint module further includes,
        a seating member secured to the first base,
        a ball between the separated portion and the first base, the ball being seated on the seating member,
    the seating member includes a plurality of shafts, and
    each of the plurality of shafts is in point contact with the ball.

11. The device according to claim 10, wherein
    the joint module is configured to maintain a constant distance between the separated portion and the first base during elastic flexion of the flexible portion;
    the joint module further includes,
        a body secured to the second base and coupled to the coupled portion,
        an extension member extending from the body toward the separated portion, and
        an adjusting member configured to adjust a distance between the extension member and the separated portion; and
    the adjusting member of the joint module including a head integrally connected to a first screw portion and a second screw portion,
        the first screw portion and the second screw portion having different thread pitches and being concentrically aligned so the first and second screw portions are configured to be rotated together
        the first screw portion screwed to the extension member, and
        the second screw portion screwed to the separated portion of the flexure.

12. The device according to claim 10, wherein the ball is attached to the separated portion by an epoxy resin.

13. A joint module configured to adjust a position of a second base relative to a first base based on elastic flexion in the joint module, the joint module comprising:
    a body configured to be secured to the second base;
    a flexure including,
        a separated portion spaced apart from the body and configured to be supported by the first base,
        a coupled portion that is coupled to the body, and
        a flexible portion between the coupled portion and the separated portion, the flexible portion configured to elastic flexion for increasing or decreasing a distance between the separated portion and the second base;
    an extension member extending from the body toward the separated portion;
    an adjusting member configured to adjust a distance between the extension member and the separated portion,
        the adjusting member including a head integrally connected to a first screw portion and a second screw portion,
        the first screw portion and second screw portion having different thread pitches and being concentrically aligned so the head and first and second screw portions are configured to be rotated together,
        the first screw portion screwed to the extension member,
        the second screw portion screwed to the separated portion of the flexure; and
    a reference member between the first screw portion and a first screw hole of the extension member, the reference member being screwed to both the first screw portion and the first screw hole.

14. The joint module according to claim 13,
    wherein the flexible portion is configured to elastic flexion based on operation of the adjusting member to increase or decrease a distance between the extension member and the separated portion.

15. The joint module according to claim 14, further comprising:
    a preload member configured to maintain a constant distance between the separated portion and the first base.

16. The joint module according to claim 14, further comprising:
    a securing member configured to restrict relative movement between the body and the flexure.

* * * * *